United States Patent
Auer et al.

(10) Patent No.: US 12,413,143 B2
(45) Date of Patent: Sep. 9, 2025

(54) PFC WITH VALLEY CONTROLLED DCM FOR AN LED LOAD

(71) Applicant: Tridonic GmbH & Co KG, Dornbirn (AT)

(72) Inventors: Hans Auer, Dornbirn (AT); Andre Mitterbacher, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 261 days.

(21) Appl. No.: 18/249,889

(22) PCT Filed: Oct. 13, 2021

(86) PCT No.: PCT/EP2021/078253
§ 371 (c)(1),
(2) Date: Apr. 20, 2023

(87) PCT Pub. No.: WO2022/089937
PCT Pub. Date: May 5, 2022

(65) Prior Publication Data
US 2023/0387794 A1 Nov. 30, 2023

(30) Foreign Application Priority Data
Oct. 26, 2020 (EP) .................................... 20203781

(51) Int. Cl.
*H02M 1/42* (2007.01)
*H02M 1/00* (2006.01)
(52) U.S. Cl.
CPC ....... *H02M 1/4225* (2013.01); *H02M 1/0025* (2021.05); *H02M 1/0058* (2021.05)
(58) Field of Classification Search
CPC .................................................. H02M 1/4225
See application file for complete search history.

(56) References Cited

U.S. PATENT DOCUMENTS

| | | | |
|---|---|---|---|
| 8,552,893 B1 * | 10/2013 | Sood | H03M 3/476 |
| | | | 323/283 |
| 10,090,757 B2 | 10/2018 | Kim et al. | |
| 2015/0054421 A1 * | 2/2015 | Auer | H05B 41/28 |
| | | | 315/247 |

OTHER PUBLICATIONS

PCT/EP2021/078253 International Search Report and Written Opinion dated Nov. 11, 2021, 12 pages.
(Continued)

*Primary Examiner* — Peter M Novak
(74) *Attorney, Agent, or Firm* — Andrus Intellectual Property Law, LLP (57) ABSTRACT

A converter (1) for operating an LED load is provided. The converter (1) comprises an actively switched power factor correction, PFC, circuitry (104-112), having a control circuitry (2-4) for controlling a switch (105) of the PFC circuitry (104-112). The control circuitry (2-4) is configured to control a switch-on timing of the switch (105) such that an output voltage (113, $V_{bus}$) of the PFC circuitry (104-112) is feedback-controlled in accordance with a nominal value (201). In a discontinuous conduction mode, DCM, the control circuitry (2-4) is configured to control an actual value (204, $T_{off\_act}$) of the switch-on timing of the switch (105) in one or more switching cycles to be a time of a valley of a voltage across the switch (105) succeeding a nominal value (302, $T_{off\_nom}$) of the switch-on timing of a control algorithm implemented by the control circuitry (2-4). The control circuitry (2-4) is further configured to control the actual value (204, $T_{off\_act}$) of the switch-on timing of the switch (105) in one or more subsequent switching cycles being subsequent to the one or more switching cycles to be a time of a valley of the voltage across the switch (105) preceding the nominal value (302, $T_{off\_nom}$) of the switch-on timing. This reconciles valley switching and avoidance of visible light flicker.

14 Claims, 4 Drawing Sheets

(56) References Cited

OTHER PUBLICATIONS

Sang Hee Kang et al., "Efficiency Optimization in Digitally Controlled Flyback DC DC Converters Over Wide Ranges of Operating Conditions", IEEE Transactions on Power Electronics, Institute of Electrical and Electronics Engineers, vol. 27, No. 8, Aug. 1, 2012.

* cited by examiner

PFC WITH VALLEY CONTROLLED DCM FOR AN LED LOAD

CROSS REFERENCE TO RELATED APPLICATIONS

The present application is the U.S. national stage application of international application PCT/EP2021/078253 filed Oct. 13, 2021, which international application was published on May 5, 2022 as International Publication WO 2022/089937A1. The international application claims priority to European Patent Application No. 20203781.8 filed Oct. 26, 2020, published Apr. 27, 2022 as EP3989422A1.

TECHNICAL FIELD OF THE INVENTION

The present invention relates to operation of light emitting diode (LED) based light sources in a discontinuous conduction mode, and in particular, to a converter for operating an LED load and a lighting system comprising such a converter.

BACKGROUND OF THE INVENTION

Converters for LED-based light sources turn electrical power from a source, such as a mains grid, to a direct current (DC) parameter of the LED load, such as a DC voltage or DC current.

The DC parameter is typically regulated in accordance with a nominal/reference value by manipulating a duty cycle of a switch of the converter using pulse-width modulation (PWM).

Depending on the implementation of the converter, this may involve different modes of operation, such as Discontinuous Conduction Mode (DCM). In this mode of operation, the switching cycles of the switch comprise a period in which all stored energy of an inductor of the converter has dissipated and the inductor current is floating or ringing due to resonant oscillations until a subsequent switching cycle begins. A switching performance is optimized by commencing the subsequent switching cycle using so-called valley switching, by closing the switch in a depression or valley of the voltage across it.

As such, an actual switch-on timing of the switch may depart from a nominal switch-on timing determined by a control circuitry of the converter, resulting in a regulation error in each switching cycle of the switch.

If a regulation of the DC parameter is relatively slow, a large amount of error may accumulate over a plurality of switching cycles. As a result, a low-frequency instability of the DC parameter may emerge, which becomes visible as light flicker.

SUMMARY OF THE INVENTION

The object of the present invention is to provide a converter and a lighting system reconciling valley switching and avoidance of visible light flicker.

The invention is defined by the appended independent claims. Preferred embodiments are set forth in the dependent claims and in the following description and drawings.

According to a first aspect, a converter for operating an LED load is provided. The converter comprises an actively switched power factor correction, PFC, circuitry, having a control circuitry for controlling a switch of the PFC circuitry. The control circuitry is configured to control a switch-on timing of the switch such that an output voltage $V_{bus}$ of the PFC circuitry is feedback-controlled in accordance with a nominal value. In a discontinuous conduction mode, DCM, the control circuitry is configured to control an actual value $T_{off\_act}$ of the switch-on timing of the switch in one or more switching cycles to be a time of a valley of a voltage across the switch succeeding a nominal value $T_{off\_nom}$ of the switch-on timing of a control algorithm implemented by the control circuitry. The control circuitry is further configured to control the actual value $T_{off\_act}$ of the switch-on timing of the switch in one or more subsequent switching cycles being subsequent to the one or more switching cycles to be a time of a valley of the voltage across the switch preceding the nominal value $T_{off\_nom}$ of the switch-on timing.

Preferably, the one or more switching cycles comprise consecutive switching cycles.

Preferably, the one or more subsequent switching cycles comprise consecutive subsequent switching cycles.

Preferably, the switch comprises a power field effect transistor, FET.

Preferably, the control circuitry is configured to calculate the nominal value $T_{off\_nom}$ of the switch-on timing of the switch in dependence of a constant duration of closure $T_{on}$ of the switch and a magnified constant duration of conductance $T_{active}$ of a diode of the PFC circuitry.

Preferably, the control circuitry is configured to calculate the nominal value $T_{off\_nom}$ of the switch-on timing of the switch by subtracting the constant duration of closure $T_{on}$ of the switch from the magnified constant duration of conductance $T_{active}$ of the diode of the PFC circuitry.

Preferably, the control circuitry comprises a sigma-delta modulator.

Preferably, the control circuitry is configured to establish an error $T_{off\_err}$ of the switch-on timing in dependence of the actual value $T_{off\_act}$ of the switch-on timing and the nominal value $T_{off\_nom}$ of the switch-on timing.

Preferably, the control circuitry is configured to establish the error $T_{off\_err}$ of the switch-on timing by subtracting the actual value $T_{off\_act}$ of the switch-on timing from the nominal value $T_{off\_nom}$ of the switch-on timing.

Preferably, the control circuitry is configured to establish a truncated accumulated error $T_{off\_acc\_err}$ of the switch-on timing in dependence of the error $T_{off\_err}$ of the switch-on timing.

Preferably, the control circuitry is configured to establish the truncated accumulated error $T_{off\_acc\_err}$ of the switch-on timing by integrating the error $T_{off\_err}$ of the switch-on timing over consecutive switching cycles and by truncating decimal digits of the integrated error.

Preferably, the control circuitry is configured to establish an adjusted value $T_{off\_adj}$ of the switch-on timing in dependence of the nominal value $T_{off\_nom}$ of the switch-on timing and the truncated accumulated error $T_{off\_acc\_err}$ of the switch-on timing.

Preferably, the control circuitry is configured to establish the adjusted value $T_{off\_adj}$ of the switch-on timing by summing up the nominal value $T_{off\_nom}$ of the switch-on timing and the truncated accumulated error $T_{off\_acc\_err}$ of the switch-on timing.

Preferably, the control circuitry is configured to establish the actual value $T_{off\_act}$ of the switch-on timing in dependence of the adjusted value $T_{off\_adj}$ of the switch-on timing.

Preferably, the control circuitry is configured to establish the actual value $T_{off\_act}$ of the switch-on timing by detecting a valley of the voltage across the switch succeeding the adjusted value $T_{off\_adj}$ of the switch-on timing.

According to a second aspect, a lighting system is provided. The lighting system comprises a converter according to the first aspect or any of its embodiments; and an LED load being configured to be operated by the converter.

BRIEF DESCRIPTION OF THE DRAWINGS

Further aspects, advantages and objects of the invention will become evident for the skilled reader by means of the following detailed description of the embodiments of the invention, when taking into conjunction with the figures of the enclosed drawings.

DETAILED DESCRIPTION OF EMBODIMENTS

The invention will now be described with respect to various embodiments. The features of these embodiments may be combined with each other unless specified otherwise.

As used herein, the term "power factor correction" may refer to an increasing/maximizing of a power factor of a load, such as an LED load. A power factor of an AC electrical power system may refer to a ratio of a real power absorbed by the load to an apparent power flowing in the circuit. Statutory provisions usually define a minimum value of a power factor that needs to be maintained.

Figure 1:
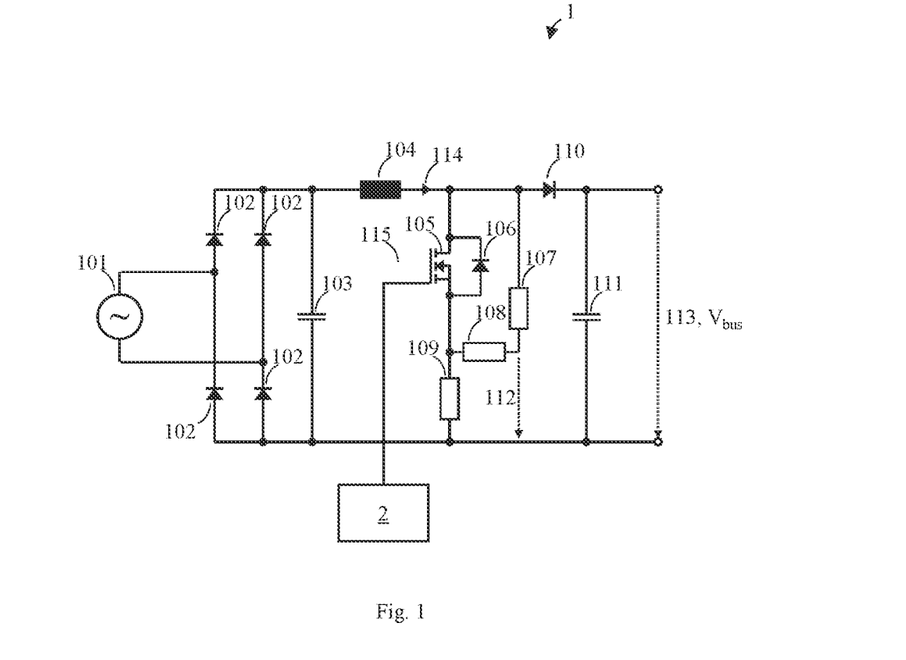
FIG. 1 illustrates a converter according to an embodiment of the present disclosure.

FIG. 1 illustrates a converter 1 according to an embodiment of the present disclosure.

The converter 1 is for operating an LED load connectable to the converter 1 and comprises an actively switched power factor correction, PFC, circuitry 104-112.

As may be taken from FIG. 1, the PFC circuitry 104-112 may be framed by smoothing capacitors 103, 111 on both sides, and be preceded by a rectifier stage, such as the depicted diode bridge including diodes 102, for rectifying an electrical power supplied by a mains grid 101.

The PFC circuitry 104-112 of FIG. 1 further comprises an inductor 104 which represents an energy storage of the converter 1.

A switch 105 of the PFC circuitry 104-112 preferably comprises a power FET. The switch 105 is configured, in a period of closure of the switch 105, to effect storage of energy supplied by the mains grid 101 in the inductor 104, and in a subsequent period of opening of the switch 105, to effect an onward transfer of the energy stored in the inductor 104 to the LED load.

The switch 105 of FIG. 1 is protected by a flyback diode 106, which is configured to eliminate flyback, i.e., a sudden voltage spike emerging across the inductor 104 on disruption of its current by the switch 105, and a resistor cascade 107, 108, 109 is configured to limit a switch current of the switch 105 and to allow for tapping a voltage 112 that provides an indication of an output voltage 113, $V_{bus}$ of the PFC circuitry 104-112.

The converter of FIG. 1 further shows a diode 110 that is configured to allow for a one-way energy transfer from the mains grid 101 via the inductor 104 towards the LED load.

With continuing reference to FIG. 1, the converter 1 further comprises a control circuitry 2 for controlling the switch 105. In particular, the control circuitry 2 is configured to control a switch-on timing of the switch 105 such that the output voltage 113, $V_{bus}$ of the PFC circuitry 104-112 is feedback-controlled in accordance with a nominal value 201 (shown in FIG. 2).

As used herein, the term "switching cycle" refers to an operation cycle of a switch of a converter, wherein the switch is driven according to a PWM scheme. The switching cycle comprises a period in which the switch is closed/conductive ("on" state), and a remaining period of the switching cycle in which the switch is open/non-conductive ("off" state). A ratio of the duration of the period of closure to the total duration of the switching cycle denotes a duty cycle of the switch, which is typically manipulated to regulate a process variable, such as an output voltage, in accordance with a nominal value.

As used herein, the term "switch-on timing" may refer to a time instant denoting a beginning of a subsequent switching cycle, or to a time duration of the remaining period of the switching cycle in which the switch is open/non-conductive.

Figure 5:
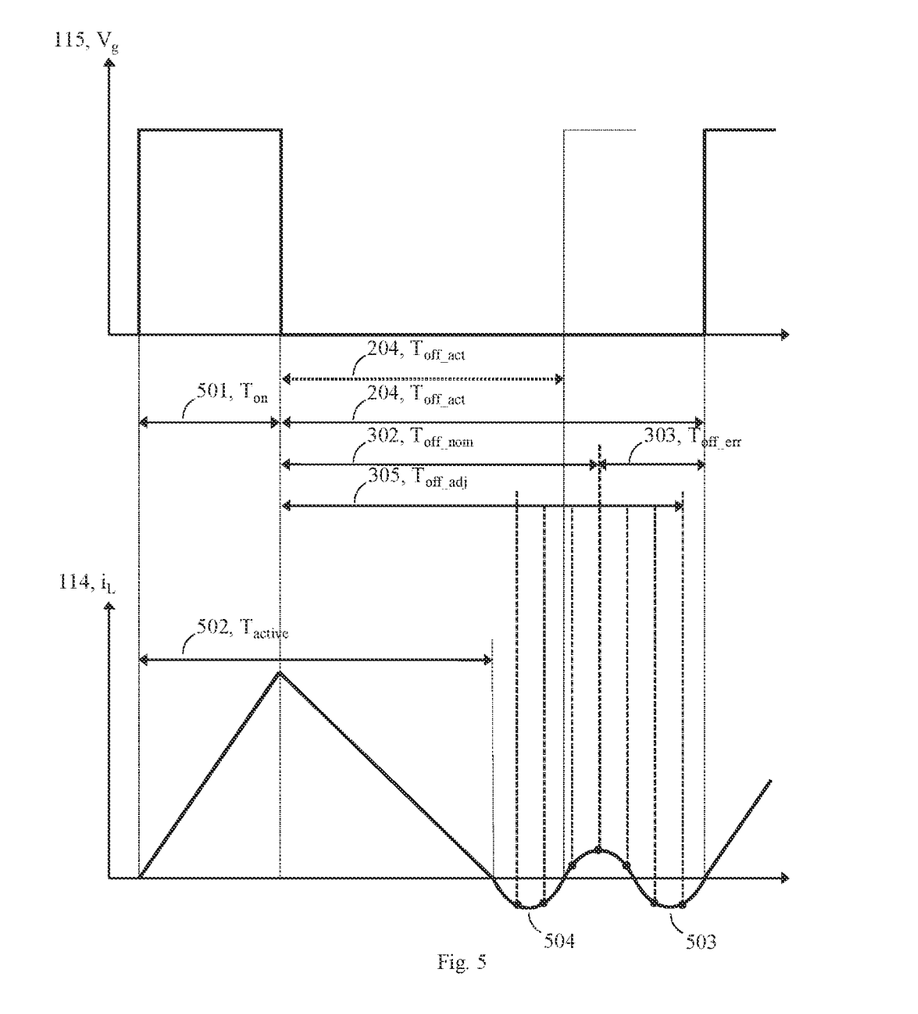
FIG. 5 illustrates a switch-on timing of the switch of the converter of FIG. 1.

In a discontinuous conduction mode, DCM, the control circuitry 2 is configured to control an actual value 204, $T_{off\_act}$ of the switch-on timing of the switch 105 in one or more switching cycles to be a time of a valley 503 of a voltage across the switch 105 succeeding a nominal value 302, $T_{off\_nom}$ of the switch-on timing of a control algorithm implemented by the control circuitry 2-4. In other words, if the nominal value 302, $T_{off\_nom}$ of the switch-on timing calculated by the control circuitry 2 coincides with a significant non-zero voltage across the switch 105, such as indicated in FIG. 5, the control circuitry 2 is configured to delay the switch-on timing such that the actual value 204, $T_{off\_act}$ of the switch-on timing succeeds the nominal value 302, $T_{off\_nom}$ and coincides with a zero-crossing voltage across the switch 105 in the valley 503 succeeding the nominal value 302, $T_{off\_nom}$.

As used herein, the term "discontinuous conduction mode" may refer to a mode of operation of a converter wherein switching cycles of a switch of the converter comprise a period in which all stored energy of an inductor of the converter has dissipated and an inductor current that decreased to zero starts floating or ringing due to resonant oscillations until a subsequent switching cycle begins.

As used herein, the term "valley" may refer to a transient depression of an electrical parameter, such as a voltage.

Preferably, the one or more switching cycles comprise consecutive switching cycles.

Likewise, the control circuitry 2 is configured to control the actual value 204, $T_{off\_act}$ of the switch-on timing of the switch 105 in one or more subsequent switching cycles that are subsequent to the one or more switching cycles to be a time of a valley 504 of the voltage across the switch 105 preceding the nominal value 302, $T_{off\_nom}$ of the switch-on timing. That is to say, the control circuitry 2 is further configured to "frontload" the switch-on timing such that the actual value 204, $T_{off\_act}$ of the switch-on timing precedes the nominal value 302, $T_{off\_nom}$ and coincides with a zero-crossing voltage across the switch 105 in the valley 504 preceding the nominal value 302, $T_{off\_nom}$.

Preferably, the one or more subsequent switching cycles comprise consecutive subsequent switching cycles.

By performing a high-frequency modulation of the nominal value $T_{off\_nom}$ of the switch-on timing in accordance with an error $T_{off\_acc\_err}$ of the switch-on timing that has accumulated over a number of switching cycles, the converter 1 achieves that the actual value $T_{off\_act}$ of the switch-on timing oscillates between valleys of the voltage across the switch that succeed or precede the nominal value $T_{off\_nom}$ of the switch-on timing, such that the actual value $T_{off\_act}$ of the switch-on timing corresponds, on average, to the nominal value $T_{off\_nom}$ of the switch-on timing. As a result, valley switching without visible light flicker is realized.

Details of the delaying and frontloading of the switch-on timing will now be explained in more detail in connection with FIGS. 2-5.

Figure 2:
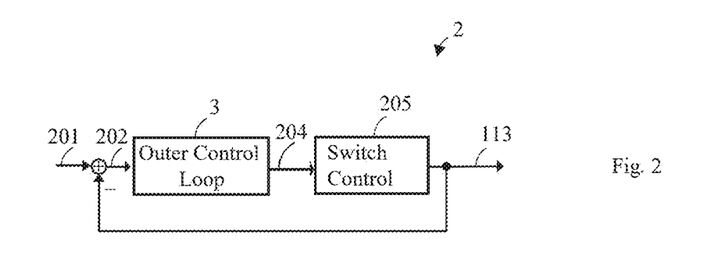
FIGS. 2-4 illustrate schematic block diagrams of a control circuitry according to an embodiment of the present disclosure in various levels of detail.
Figure 3:
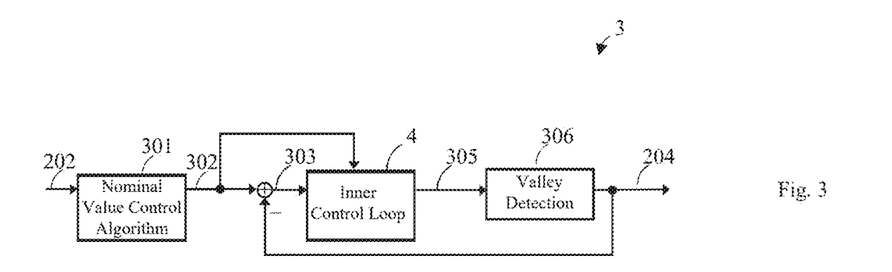
Figure 4:
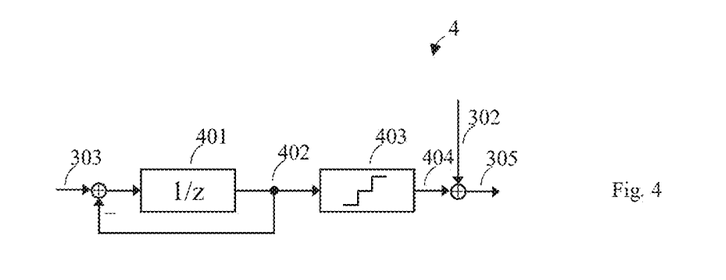

FIGS. 2-4 illustrate schematic block diagrams of a control circuitry 2-4 according to an embodiment of the present disclosure in various levels of detail. In connection with the following description of FIGS. 2-4, also FIG. 5 will be referenced, which illustrates a switch-on timing of the switch 105 of the converter 1 of FIG. 1.

An upper portion of FIG. 5 shows a switching cycle of the switch 105 as represented by a gate voltage 115, $V_g$ of the switch 105.

The switching cycle comprises a period in which the switch 105 is closed/conductive ("on" state) in accordance with a high-level gate voltage 115, $V_g$ for a constant duration of closure denoted as 501, $T_{on}$. In a remaining period of the switching cycle, the switch 105 is open/non-conductive ("off" state) in accordance with a vanishing gate voltage 115, $V_g$ for a variable duration denoted as actual value 204, $T_{off\_act}$ of the switch-on timing.

A lower portion of FIG. 5 shows an inductor current 114, $i_L$ resulting from the switching cycle of the switch 105. As the converter 1 of FIG. 1 is preferably DCM operated, the outer loop controller 3 (see FIG. 3) of control circuitry 2-3 is preferably configured to calculate the nominal value 302, $T_{off\_nom}$ of the switch-on timing of the switch 105 in dependence of the constant duration of closure 501, $T_{on}$ of the switch 105 and a magnified constant duration of conductance 502, $T_{active}$ of the diode 110 of the PFC circuitry 104-112. That is to say, the outer loop controller 3 of the control circuitry 2-4 is preferably configured to calculate the nominal value 302, $T_{off\_nom}$ of the switch-on timing of the switch 105 by subtracting the constant duration of closure 501, $T_{on}$ of the switch 105 from the magnified (by scalar K) constant duration of conductance 502, $T_{active}$ of the diode 110 of the PFC circuitry 104-112, in accordance with the following equation:

$$T_{off\_nom} = K \cdot T_{active} - T_{on}, (K>1 \text{ for DCM})$$

With reference to FIG. 5, it will be appreciated that as the duration of closure 501, $T_{on}$ of the switch 105 is held constant in DCM operation, so is the duration of conductance 502, $T_{active}$ of the diode 110 until the conduction of the diode becomes discontinuous. The scalar K>1 in the above formula is used to express that in this mode of operation, each switching cycle of the switch 105 comprises a period in which all stored energy of the inductor 104 of the converter 1 has dissipated and its current 114, $i_L$ is floating or ringing until a subsequent switching cycle commences. To this end, FIG. 5 shows two valleys 503, 504 emerging in the floating or ringing period of the switching cycle.

FIG. 2 shows a block diagram of a relatively slow outer control loop of the output voltage 113, $V_{bus}$ of the PFC circuitry 104-112 of FIG. 1. In other words, the output voltage 113, $V_{bus}$ is feedback-controlled in accordance with a nominal value 201 as the reference value of the outer control loop.

As such, the control circuitry 2 of FIG. 2 is preferably configured to establish a regulation error 202 of the outer control loop in dependence of the nominal value 201 and the output voltage 113, $V_{bus}$. In more detail, the control circuitry 2 is preferably configured to establish the regulation error 202 by subtracting the output voltage 113, $V_{bus}$ from the nominal value 201.

An outer loop controller 3 is configured to transform the regulation error 202 to the actual value 204, $T_{off\_act}$ of the switch-on timing as the manipulated variable of the control loop. Details of this transformation will be explained in connection with FIG. 3 below.

Subsequently, the control circuitry 2 is preferably configured to establish the output voltage 113, $V_{bus}$ in dependence of the actual value 204, $T_{off\_act}$ of the switch-on timing. More specifically, the switch 105, which is included in process 205, is closed in accordance with the actual value 204, $T_{off\_act}$ of the switch-on timing to begin a subsequent switching cycle, which results in the desired output voltage 113, $V_{bus}$ in the long run.

FIG. 3 shows a more detailed block diagram of the outer loop controller 3 of FIG. 2. As already mentioned, the outer loop controller 3 is configured to transform the regulation error 202 to the actual value 204, $T_{off\_act}$ of the switch-on timing.

The control algorithm 301 implemented by the control circuitry 2-3 is configured to provide the nominal value 302, $T_{off\_nom}$ of the switch-on timing in dependence of the regulation error 202 of the outer control loop. In the example of FIG. 5, this nominal value 302, $T_{off\_nom}$ corresponds to a peak of the inductor current 114, $i_L$, or equivalently, of the voltage across the switch 105, in the interest of better understanding.

The nominal value 302, $T_{off\_nom}$ of the switch-on timing needs to be turned into the actual value 204, $T_{off\_act}$ of the switch-on timing, which defines the actual beginning of the subsequent switching cycle. In the example of FIG. 5, the actual value 204, $T_{off\_act}$ of the switch-on timing effects an activation/closure of the switch 105 when the voltage across it experiences a zero crossing.

Preferably, the control circuitry 2 comprises a sigma-delta modulator to obtain the actual value 204, $T_{off\_act}$ of the switch-on timing, which sigma-delta modulator is explained in the following.

A relatively responsive inner control loop transforms the provided nominal value 302, $T_{off\_nom}$ of the switch-on timing to the actual value 204, $T_{off\_act}$ of the switch-on timing. In other words, the actual value 204, $T_{off\_act}$ of the switch-on timing is feedback-controlled in accordance with the nominal value 302, $T_{off\_nom}$ of the switch-on timing as the reference value of the inner control loop.

The control circuitry 2-3 is preferably configured to establish an error 303, $T_{off\_err}$ of the switch-on timing in dependence of the actual value 204, $T_{off\_act}$ of the switch-on timing and the nominal value 302, $T_{off\_nom}$ of the switch-on timing. In more detail, the control circuitry 2-3 is preferably configured to establish the error 303, $T_{off\_err}$ of the switch-on timing by subtracting the actual value 204, $T_{off\_act}$ of the switch-on timing from the nominal value 302, $T_{off\_nom}$ of the switch-on timing. In the example of FIG. 5, the error 303, $T_{off\_err}$ of the switch-on timing is depicted as the difference of the actual value 204, $T_{off\_act}$ of the switch-on timing and the nominal value 302, $T_{off\_nom}$ of the switch-on timing.

An inner loop controller 4 is configured to transform the error 303, $T_{off\_err}$ of the switch-on timing to an adjusted value 305, $T_{off\_adj}$ of the switch-on timing as the manipulated variable of the control loop. Details of this transformation will be explained in connection with FIG. 4 below.

Subsequently, the control circuitry 2-3 is preferably configured to establish the actual value 204, $T_{off\_act}$ of the switch-on timing in dependence of the adjusted value 305, $T_{off\_adj}$ of the switch-on timing. More specifically, the control circuitry 2-3 is preferably configured to establish the actual value 204, $T_{off\_act}$ of the switch-on timing by detecting one of the valleys 503, 504 (see FIG. 5) of the voltage across the switch 105 succeeding the adjusted value 305, $T_{off\_adj}$ of the switch-on timing. Thus, the adjusted value 305, $T_{off\_adj}$ of the switch-on timing may denote a beginning of a valley detection. According to the example of FIG. 3, a valley detection block 306 may be used to this end.

FIG. 4 shows a more detailed block diagram of the inner loop controller 4 of FIG. 3. As already mentioned, the inner loop controller 4 is configured to transform the error 303, $T_{off\_err}$ of the switch-on timing to the adjusted value 305, $T_{off\_adj}$ of the switch-on timing.

The control circuitry 2-4 is preferably configured to establish the adjusted value 305, $T_{off\_adj}$ of the switch-on timing in dependence of the nominal value 302, $T_{off\_nom}$ of the switch-on timing and a truncated accumulated error 404, $T_{off\_acc\_err}$ of the switch-on timing. More precisely, the control circuitry 2-4 is preferably configured to establish the adjusted value 305, $T_{off\_adj}$ of the switch-on timing by summing up the nominal value 302, $T_{off\_nom}$ of the switch-on timing and the truncated accumulated error 404, $T_{off\_acc\_err}$ of the switch-on timing.

In turn, the control circuitry 2-4 is preferably configured to establish the truncated accumulated error 404, $T_{off\_acc\_err}$ of the switch-on timing in dependence of the error 303, $T_{off\_err}$ of the switch-on timing. That is to say, the control circuitry 2-4 is preferably configured to establish the truncated accumulated error 404, $T_{off\_acc\_err}$ of the switch-on timing by integrating the error 303, $T_{off\_err}$ of the switch-on timing over consecutive switching cycles and by truncating 403 decimal digits of the integrated error 402.

According to the example of FIG. 4, an integration block 401 indicated by a "1/z" label may be used to integrate the error 303, $T_{off\_err}$ of the switch-on timing over consecutive switching cycles to yield the integrated error 402, and an integer/truncation block 403 indicated by a stair symbol may be used to truncate the decimal digits of the integrated error 402.

The truncated accumulated error 404, $T_{off\_acc\_err}$ of the switch-on timing adjusts the nominal value 302, $T_{off\_nom}$ of the switch-on timing to yield the adjusted value 305, $T_{off\_adj}$ of the switch-on timing, which may denote a beginning of a valley detection. In the example of FIG. 5, a plurality of dots on the graph of the inductor current 114, $i_L$ represents possible positive or negative adjustments of the nominal value 302, $T_{off\_nom}$ of the switch-on timing by the truncated accumulated error 404, $T_{off\_acc\_err}$ of the switch-on timing. Depending on the particular adjustment, i.e., depending on the adjusted value 305, $T_{off\_adj}$ of the switch-on timing, a valley detection may begin at a time instant corresponding to the respective dot. For example, beginning the valley detection at one of the dots in the first valley 504 may result in a beginning of the subsequent switching cycle within or at the end of the first valley 504, as is indicated by a suggested rising edge of the gate voltage 115, $V_g$ of the switch 105 in FIG. 5. As another example, beginning the valley detection at one of the dots between the valleys 504, 503 or in the second valley 504 may result in a beginning of the subsequent switching cycle within or at the end of the first valley 504, as is indicated by a rising edge of the gate voltage 115, $V_g$ in FIG. 5.

Figure 6:
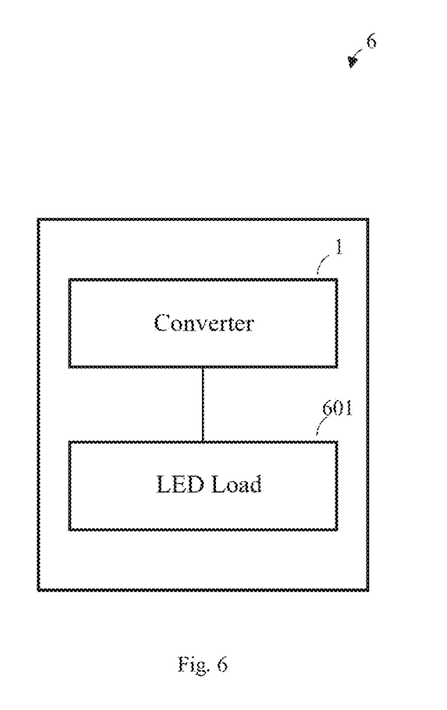
FIG. 6 illustrates a lighting system according to an embodiment of the present disclosure.

FIG. 6 illustrates a lighting system 6 according to an embodiment of the present disclosure.

The lighting system 6 comprises a converter 1 according to the first aspect of the present disclosure or any of its embodiments; and an LED load 601, which is configured to be operated by the converter 1.

The invention claimed is:

1. A converter (1) for operating an LED load, comprising:
    an actively switched power factor correction, PFC, circuitry (104-112), having a switch 105, an inductor 104, and
    a control circuitry (2-4) for controlling a duty cycle of the switch (105) of the PFC circuitry (104-112) via pulse width modulation,
    wherein the control circuitry (2-4) is configured to calculate a nominal switch-on timing (302, $T_{off\_nom}$) of the switch (105) such that an output voltage (113) of the PFC circuitry (104-112) is feedback-controlled in accordance with a nominal value (201);
    wherein in a discontinuous conduction mode, DCM, the control circuitry (2-4) is configured to control an actual switch-on timing (204, $T_{off\_act}$) of the switch (105) in one or more switching cycles based on current detected through the inductor 104 and to be a time corresponding to a rising zero crossing of the inductor current from a valley (503) succeeding the nominal switch-on timing (302, $T_{off\_nom}$); and
    wherein the control circuitry (2-4) is further configured to control the actual switch-on timing (204, $T_{off\_act}$) of the switch (105) in one or more switching cycles to be a time corresponding to a rising zero crossing of the inductor current from a valley (504) preceding the nominal switch-on timing (302, $T_{off\_nom}$); and
    wherein the control circuitry is configured to fluctuate as necessary between valleys that the succeed and precede the calculated nominal switch-on timing (302, Toff_nom) of the switch (105) such that the actual switch-on timing (204, Toff_act) of the switch (105) corresponds on average approximately to said calculated nominal switch-on timing (302, Toff_nom) so that the LED load does not flicker due to valley switching.

2. The converter (1) of claim 1, wherein the switch (105) is a power field effect transistor, FET.

3. A lighting system (6), comprising:
    a converter (1) of claim 1; and
    an LED load (601) being configured to be operated by the converter (1).

4. The converter (1) of claim 1, wherein the control circuitry (2-4) is configured to calculate the nominal value switch-on timing (302, Toff_nom) of the switch (105) in accordance with a constant duration of closure (501, $T_{on}$) of the switch (105) and a magnified constant duration of conductance (502, $T_{active}$) of a diode (110) of the PFC circuitry (104-112).

5. The converter (1) of claim 4, wherein the control circuitry (2-4) is configured to calculate the nominal switch-on timing 302, Toff_nom) of the switch (105) by subtracting the constant duration of closure (501, $T_{on}$) of the switch (105) from the magnified constant duration of conductance (502, $T_{active}$) of the diode (110) of the PFC circuitry (104-112).

6. The converter (1) of claim 1, wherein the control circuitry (2-4) comprises a sigma-delta modulator (3-4).

7. The converter (1) of claim 6, wherein the control circuitry (2-4) is configured to establish an error (303, $T_{off\_err}$) of the switch-on timing in dependence of the actual switch-on timing (204, $T_{off\_act}$) and the nominal switch-on timing (302, $T_{off\_nom}$).

8. The converter (1) of claim 7, wherein the control circuitry (2-4) is configured to establish the error (303, $T_{off\_err}$) of the switch-on timing by subtracting the actual switch-on timing (204, $T_{off\_act}$) of the switch-on timing from the nominal value (302, $T_{off\_nom}$) of the switch-on timing.

9. The converter (1) of claim 6, wherein the control circuitry (2-4) is configured to establish a truncated accumulated error (404, $T_{off\_acc\_err}$) of the switch-on timing in dependence of the error (303, $T_{off\_err}$) of the switch-on timing.

10. The converter (1) of claim 9, wherein the control circuitry (2-4) is configured to establish the truncated accumulated error (404, $T_{off\_acc\_err}$) of the switch-on timing by integrating the error (303, $T_{off\_err}$) of the switch-on timing over consecutive switching cycles and by truncating decimal digits of the integrated error (402).

11. The converter (1) of claim 6, wherein the control circuitry (2-4) is configured to establish an adjusted value (305, $T_{off\_adj}$) of the switch-on timing in dependence of the nominal switch-on timing (302, $T_{off\_nom}$) and the truncated accumulated error (404, $T_{off\_acc\_err}$) of the switch-on timing.

12. The converter (1) of claim 11, wherein the control circuitry (2-4) is configured to establish the adjusted value (305, $T_{off\_adj}$) of the switch-on timing by summing up the nominal switch-on timing (302, $T_{off\_nom}$) and the truncated accumulated error (404, $T_{off\_acc\_err}$) of the switch-on timing.

13. The converter (1) of claim 1, wherein the control circuitry (2-4) is configured to establish the actual switch-on timing (204, $T_{off\_act}$) in dependence of the adjusted value (305, $T_{off\_adj}$) of the switch-on timing.

14. The converter (1) of claim 13, wherein the control circuitry (2-4) is configured to establish the actual switch-on timing (204, $T_{off\_act}$) by detecting a valley of the voltage across the switch (105) succeeding the adjusted value (305, $T_{off\_adj}$) of the switch-on timing.

\* \* \* \* \*

UNITED STATES PATENT AND TRADEMARK OFFICE
CERTIFICATE OF CORRECTION

PATENT NO. : 12,413,143 B2
APPLICATION NO. : 18/249889
DATED : September 9, 2025
INVENTOR(S) : Hans Auer et al.

Page 1 of 1

It is certified that error appears in the above-identified patent and that said Letters Patent is hereby corrected as shown below:

In the Claims

Claim 4, Column 8, Line 45, after "nominal" delete "value".

Signed and Sealed this
Fourth Day of November, 2025

John A. Squires
*Director of the United States Patent and Trademark Office*